United States Patent

[11] 3,618,996

| [72] | Inventor | Jean G. Cadiou |
| --- | --- | --- |
| | | Saint-Cloud, France |
| [21] | Appl. No. | 875,935 |
| [22] | Filed | Nov. 12, 1969 |
| [45] | Patented | Nov. 9, 1971 |
| [73] | Assignee | Societe Anonyme Automobiles Citroen |
| | | Paris, France |
| [32] | Priority | Nov. 14, 1968 |
| [33] | | France |
| [31] | | 173 702 |

[54] BUMPERS FOR MOTOR VEHICLES
6 Claims, 3 Drawing Figs.

[52] U.S. Cl. ................................................ 293/63,
293/73, 296/76
[51] Int. Cl. ........................................... B60r 19/08,
B62d 25/12
[50] Field of Search .......................................... 293/69, 73,
63; 296/76, 56

[56] References Cited
UNITED STATES PATENTS

| 2,569,218 | 9/1951 | Bailey, Jr. ..................... | 180/69 |
| --- | --- | --- | --- |
| 3,451,710 | 6/1969 | Savell .......................... | 293/73 |

Primary Examiner—Arthur L. La Point
Assistant Examiner—Robert Saifer
Attorney—Ward, McElhannon, Brooks & Fitzpatrick ABSTRACT: This invention relates to a bumper constituted at least by one central element and two stops, each comprising a reinforcement rigidly fixed to the central element, wherein the reinforcement of each stop is rigidly fixed to a movable panel articulated to a rigid frame, while the reinforcement is in abutment on the frame when the panel is in closed position with respect to said frame.

3,618,996

BUMPERS FOR MOTOR VEHICLES

The present invention relates to improvements in or relating to bumpers in motor vehicles.

Different types of bumpers in motor vehicles are known in the art which are fairly well adapted to the role given to them, at least in conventional vehicles. Of course, they are not always as effective as would be desirable, and they often prove awkward when the vehicle is being used. In particular, where rear bumpers are concerned, they prevent direct access to the luggage boots, without a threshold to be overcome. These disadvantages which often appear in conventional vehicles are accepted as being the general rule in vehicles equipped for example with a rear boot door articulated to the roof of the vehicle by horizontal hinges. This is all the more regrettable as it is nowadays known to make boot floor boards lower than heretofore, and therefore as the production of known bumpers is even more unfavorable from the point of view of access to the boot, which was not the case previously.

It is an aim of the invention to remedy this state of affairs and to this end it proposes an original bumper of novel design, which is rigidly secured to the door near to which it is disposed.

The present invention therefore relates to a bumper, constituted at least by one central element and two stops each comprising a reinforcement rigidly fixed to the central element. The reinforcement of each stop is rigidly fixed to a movable panel, such as the boot door of a motor vehicle, articulated to a rigid frame, said fixation preferably being effected on the part of the movable panel opposite the articulation, whilst the reinforcement is in abutment on said frame, preferably by the interposition of a flexible cushioning member made of elastomer for example, when the panel is in position of closure with respect to the frame.

The bumper advantageously also comprises two side elements fixed to the rigid frame, whilst each reinforcement comprises, at its end fixed to the central element of the bumper, a flexible cushioning member, made of elastomer for example, and that when the movable panel is in position of closure, this cushioning member is in abutment on a side element of the bumper.

Finally, the central element of the bumper is advantageously disposed at a distance from the movable panel determined by the central element's capacity for deformation.

In order that the invention may be more clearly understood, and to explain various secondary features and their advantages, one embodiment thereof will now be described by way of example with reference to the accompanying drawings, in which.

Figure 1:
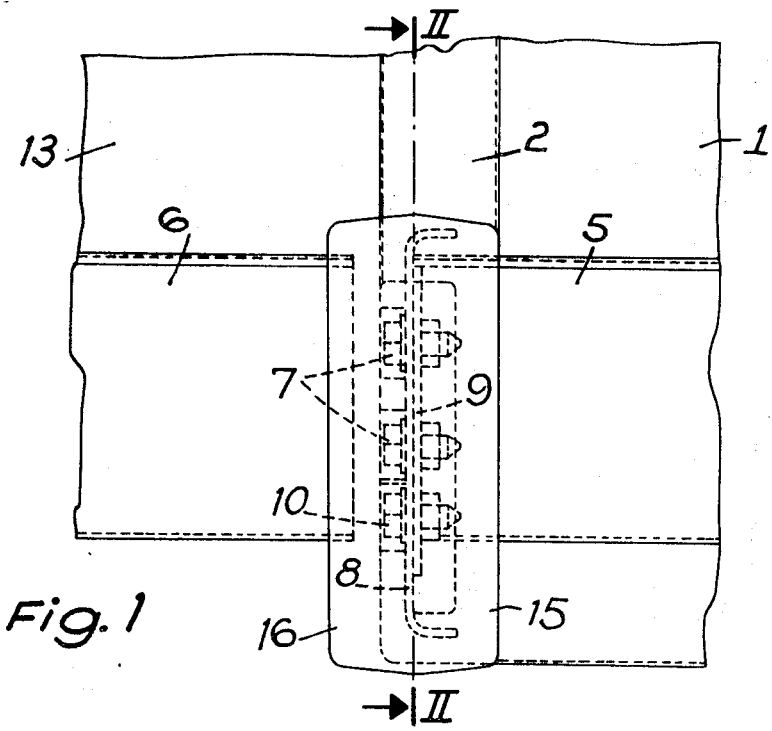
FIG. 1 is a part elevational view of a boot cover of a vehicle having a bumper according to the invention.
Figure 3:
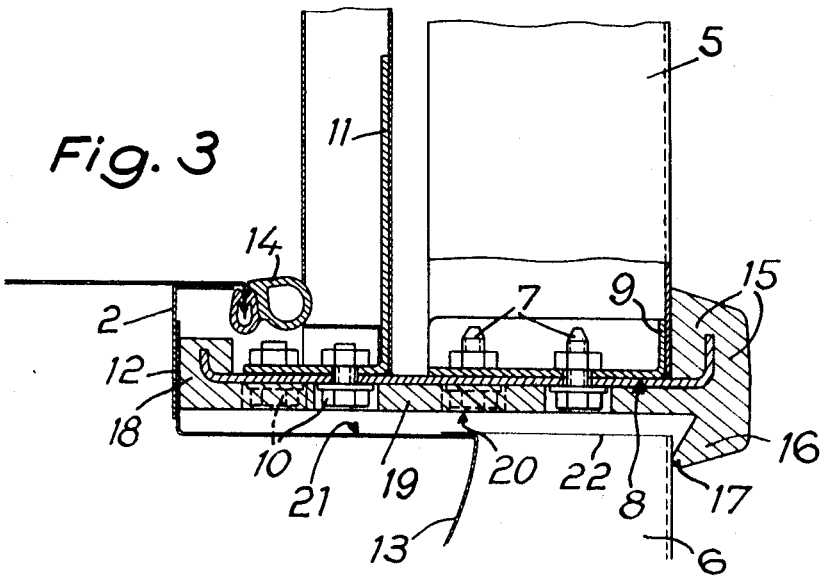
FIG. 3 shows a section along III—III of FIG. 2, the boot cover being in closed position.

The embodiment described hereinafter is thus the application of the invention to a vehicle and more specifically to the rear bumper of said vehicle equipped with a rear boot with access door 1 articulated to the rigid frame 2 securely connected to the bodywork. The door 1 is articulated about the axis of rotation 3 by hinges 4. This bumper is constituted by a central element 5 and two side elements 6, one of which may be seen in FIGS. 1 and 3. The central element 5 is fixed by screws and nuts 7 onto two reinforcements 8, one to each of its ends, reinforcing members 9 being moreover arranged on this central element where the fixations are made. The reinforcements 8 are mounted to be unitary with the door 1 by screws and nuts 10 with the interposition of members 11 reinforcing the door where the fixations are made. In this way, door 1, central element 5 and reinforcements 8 are securely connected with one another. It should be noted that the central element 5 is arranged at a certain distance from the door 1. Frame 2 extends over the vertical sides of the door by lateral water evacuation members 12, connected to the sides 13 of the bodywork and fixed at the level of the reinforcements 8, at the end of the side sills 24 which are particularly resistant. It will be observed that a sealing joint 14 is fixed to one edge of the frame 2, which may easily be crushed by the door 1 when said latter is closed. The side elements 6 are rigidly secured to the zones or sides 13 of the bodywork and are arranged substantially in line with the central element 5 when the door 1 is in closed position. It will be further specified that the reinforcements 8 are provided with an elastomer cushioning member whose essential three characteristics are as follows: on the door 1 on the part of the reinforcement 8 facing the outside of the vehicle, the cushioning member is shaped as a stop 15 so that a certain thickness of elastomer covers the outside face of the reinforcement 8, but also that the elastomer, at the point where the reinforcement 8 is located, fills the space between said reinforcement 8 and the central element 5; the stop 15 extends laterally into an element 16 which tapers to point 17 which is in contact with the side element 6 of the bumper; finally the part of the reinforcement 8 facing the inside of the vehicle is provided with a support element 18 for the cushioning member in contact with the base of the lateral water evacuation means 12 at right angles to their junction with the end of the side sills 24 of the frame. The side face of the reinforcement opposite that in contact with the reinforcing members 9 and 11 is possibly provided with a layer of elastomer 19 which forms the connection between the stop 15 and 16 and the support element 18. It is of such thickness that there is a clearance between its outside face 20 and the faces 21 of the side 13 of the bodywork and 22 of the bumper 6, which are opposite the face 20. Finally, it will be observed that, when the door 1 is closed the bumper 5 is located above the level of the floor board 23 of the foot.

The advantages of a bumper in accordance with the embodiment which has just been described are numerous.

Firstly, it fulfills its role as bumper to a satisfactory degree. Of course, this feature would appear to be normal, but is not always the case in known bumpers. The device described thus constitutes a good bumper. In fact, if a moderate stress is exerted on the central element 5 and/or at right angles to the stops 15, this stress is transmitted to the reinforcements 8 without damage thereto since they are robust, protected by the stop 15 and disposed in such a manner that their edge faces the direction of the stress. The assembly composed of door 1, element 5 and reinforcement 8 pivots easily about the axis 3, and the support element 18, designed to transmit the stress, is compressed between the reinforcement 8 and the lateral water evacuation means 12 reinforced at this level by the presence of the rigid panels of the side sills 24. When the stress ceases, the support element 18 relaxes and the assembly returns to its initial configuration, without any permanent deformation occuring. Moreover, it will be observed that a complementary support is embodied by the point 17 of the element 16 which is in contact with the side bumper 6 rigidly connected in the present embodiment, to the bodywork 13 and which consequently indirectly supports part of the stresses applied. There is no need to emphasize the role of the joint 14 which ensures the seal between the door 1 and the frame 2. If a violent stress is now exerted on the central element 5, for example caused by an impact, part of this stress will be transmitted according to the preceding procedure and the rest will create a permanent deformation of the central element 5. However, this permanent deformation will leave door 1 and frame 2 intact; the door 1 because the central element 5 was fixed at such a distance on the door 1 that it may be deformed without penetrating therein, the frame 2 because it is designed so as to remain nondeformable. It is of course obvious that the above-mentioned arrangement conforms with the height requirements as laid down by the rules in force, this having for its effect to impose a high "bumper" line overhanging the level of the floor board 23, as is the case in the conventional solutions.

Figure 2:
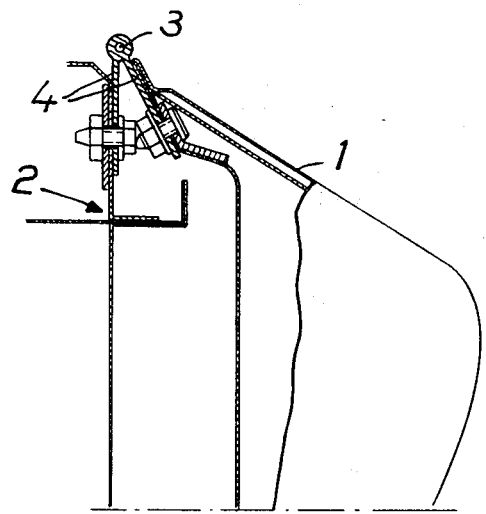
FIG. 2 is a section along II—II of FIG. 1, passing through the upper part of the cover (not shown in FIG. 1)
Figure 2:
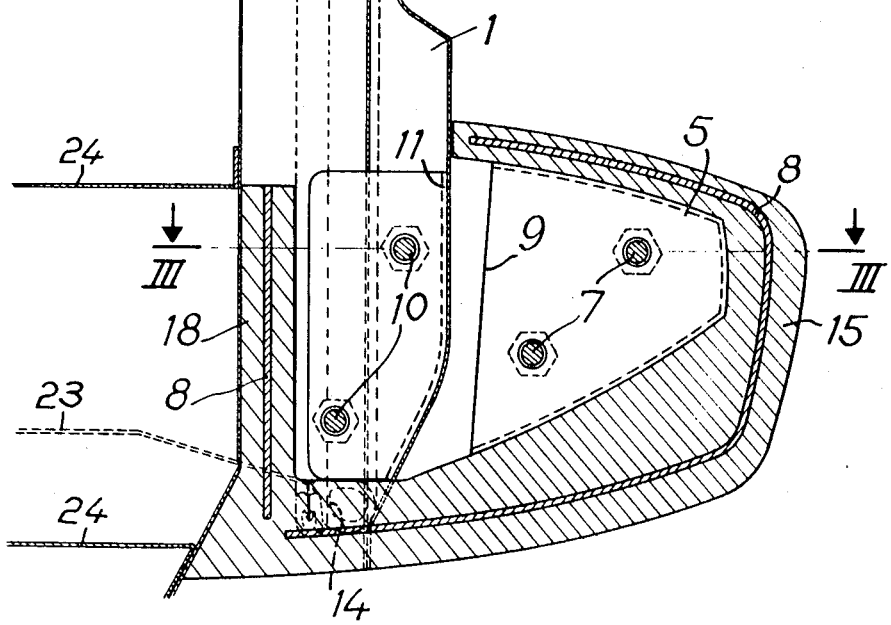

The operational advantage of a device according to the invention will now be specified. In a vehicle equipped with a conventional bumper, this latter is secured completely to the bodywork, and the solutions lie either in having a door which reaches the upper edge of the bumper and is adapted thereto in a more or less sealed manner by a joint which is at a level higher than that of the floor board of the boot, or in disposing the axis of rotation of the door a long way towards the front of the vehicle, so as to pass the bottom of the door to the limit of the forward facing surface of the bumper. In any case, the threshold of the bumper must be cleared in order to get into the boot. On the other hand, a vehicle equipped with the bumper according to the invention has a boot floor board 23 which is completely free when the door is opened, since the central element 5 of the bumper rises with the door 1 to which it is rigidly secured. The low part of the sealing joint 14 (see FIG. 2) is disposed at a level lower than that of the floor board 23; a slight fault in the seal would therefore not lead to the boot flooding. The axis of rotation 3 of the movable panel is free of any positional control, the designer no longer having to take into account the obstacle usually created by the bulk of the bumper when calculating clearance.

I claim:

1. A bumper for a motor vehicle having a movable panel articulated to a rigid frame which comprises:
a central element;
at least two stops, each including a reinforcement member, said reinforcement members being rigidly fixed at one end to said central element and at the other end to said movable panel, said reinforcement members being provided with a flexible cushioning member at the end fixed to the movable panel, said cushioning members and reinforcement members being arranged to abut said rigid frame when said movable panel is in its closed position.

2. A bumper as claimed in claims 1, wherein the central element is arranged at a distance from the movable panel determined by the central element's capacity for deformation.

3. A bumper as claimed in claim 1, wherein the reinforcement member of each stop is fixed to the part of said movable panel opposite the articulation point of the panel on the rigid frame.

4. A bumper as claimed in claim 1, wherein the movable panel constitutes the boot door of a motor vehicle.

5. A bumper as claimed in claim 1 which further comprises two side elements mounted to said rigid frame and a flexible cushioning member mounted to each of said reinforcement members at the ends fixed to said central element, said cushioning members being adapted to abut said side elements when said movable panel is in a closed position.

6. A bumper as claimed in claim 5 wherein said cushioning members are made of elastomer.

* * * * *